Dec. 27, 1966  A. BOSCHI ETAL  3,293,882
ELASTIC UNIVERSAL JOINTS FOR THE TRANSMISSION OF TORQUE
Filed Sept. 29, 1964  4 Sheets-Sheet 1

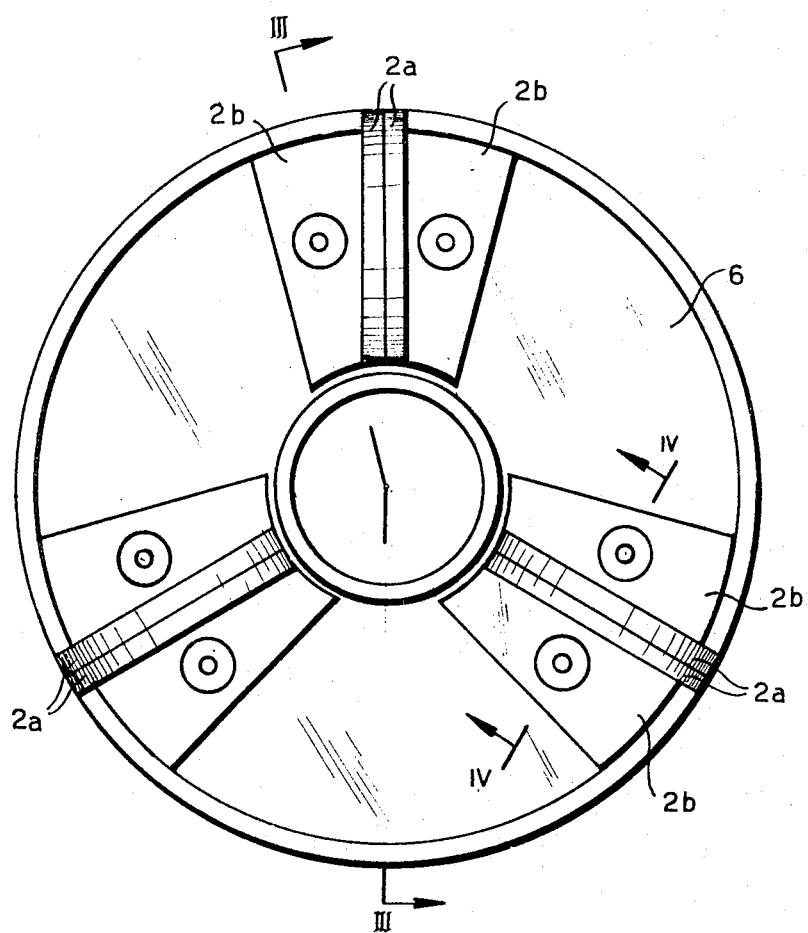

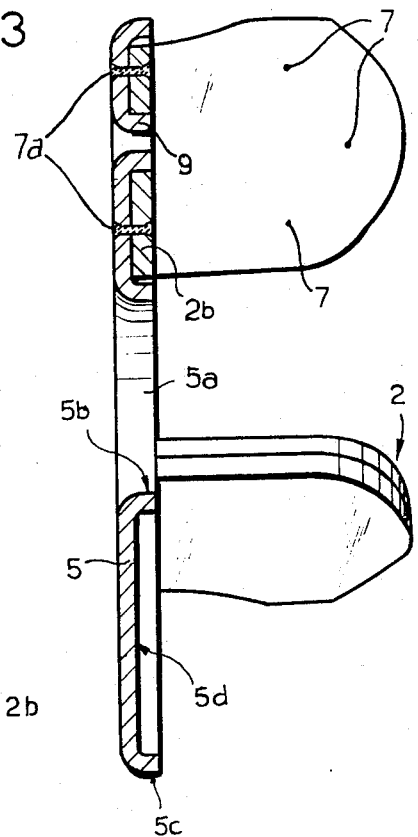
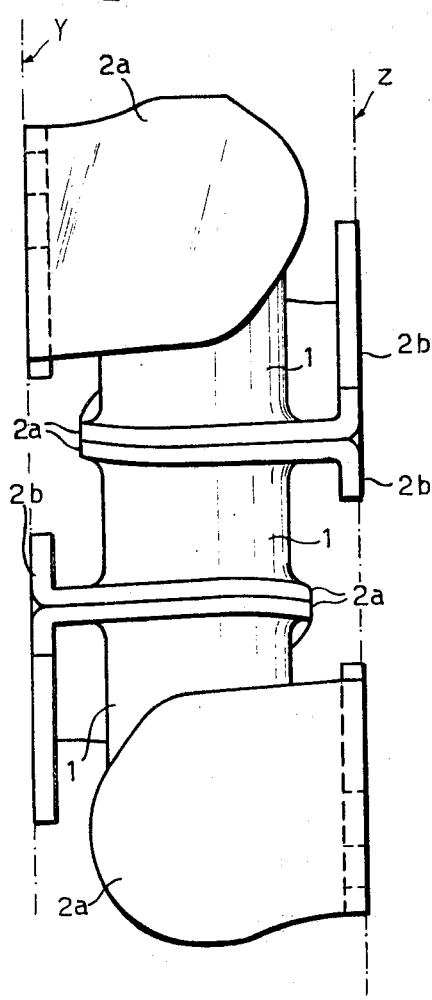

United States Patent Office 3,293,882
Patented Dec. 27, 1966

3,293,882
ELASTIC UNIVERSAL JOINTS FOR THE TRANSMISSION OF TORQUE
Antonio Boschi and Mario Rubietti, Milan, Italy, assignors to Societa Applicazioni Gomma Antivibranti "SAGA" S.p.A., Milan, Italy
Filed Sept. 29, 1964, Ser. No. 399,980
Claims priority, application Italy, Jan. 24, 1964, 1,581/64
1 Claim. (Cl. 64—14)

This invention relates to elastic universal joints for the transmission of torque, of the character comprising a pair of spiders and a polygonal ring of rectilinear rubber dowels connected to one another end to end by rigid plate-like connectors located in radial planes, alternate connectors being fast with their respective spiders.

The invention provides an improved joint of the above-defined character, which is characterized in that each of the two spiders comprises a circular cap of a sheet-metal having a hub axially fitted to its central zone, and in that each of the connectors comprises at least one wing integrally formed therewith, by means of which the connector is fastened to the face of its respective cap turned towards the other cap.

In an advantageous embodiment of the invention, each connector is formed by a pair of mutually superposed plates welded to each other, each of said plates having its own wing fastened to its supporting cap. Moreover, each of the two caps preferably comprises a flanged central aperture forming a seat for the hub, the latter being welded to the cup.

Still moreover, connector-locating means consisting of interengaging bosses and apertures are advantageously formed in the wings and caps, so that the connectors may be properly located on their caps before the wings are welded to the caps on assembly of the joint.

Figure 1:
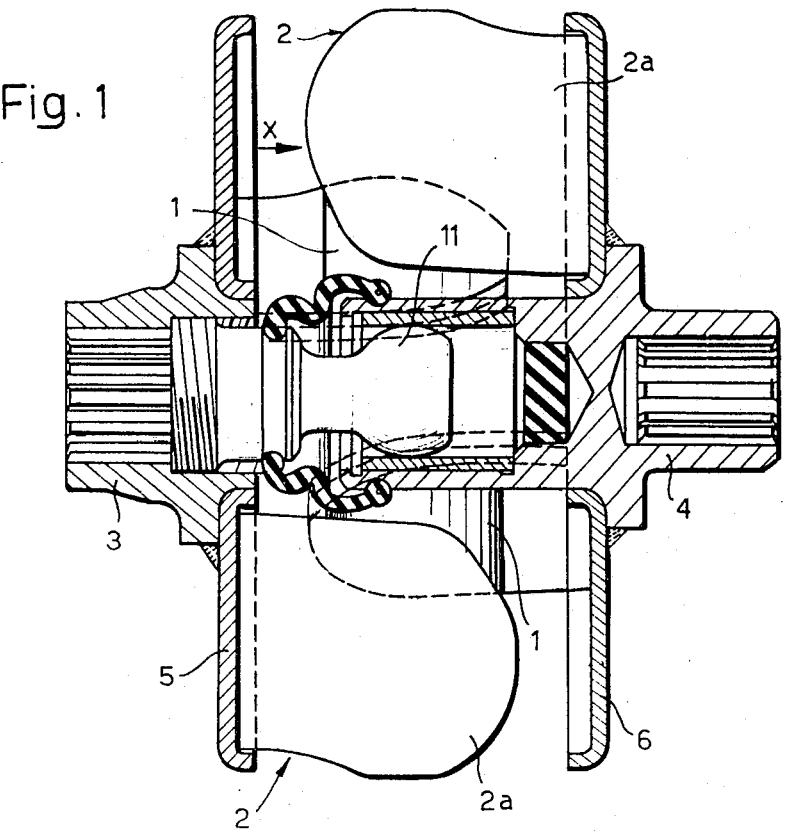
Figure 4:
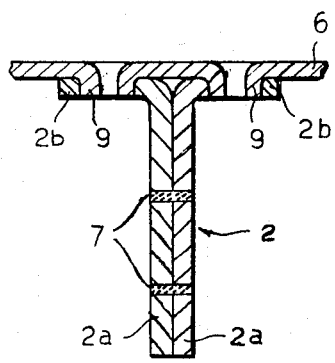
Figure 5:
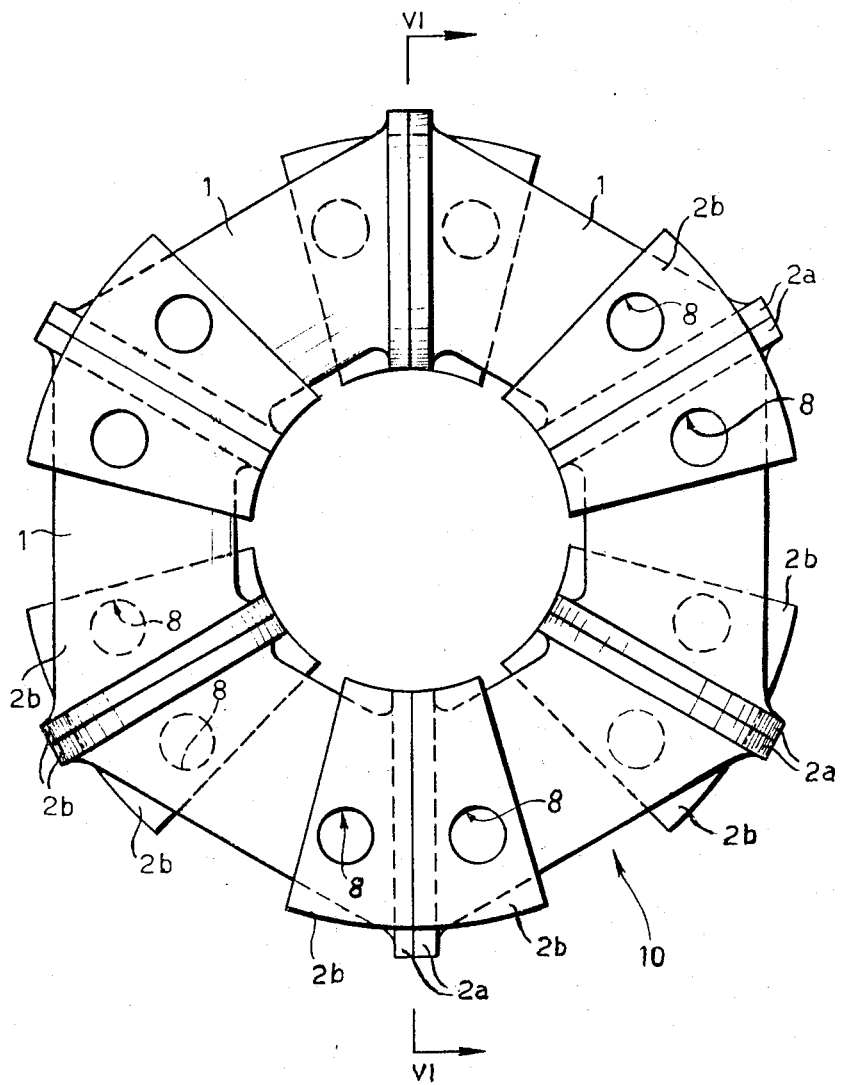

The invention will now be further described with reference to the accompanying drawings, in which:

FIGURE 1 is an axial sectional view of a joint embodying the features of this invention;
FIGURE 2 is a view in the direction X of FIG. 1 showing one of the two spiders with its respective connectors;
FIGURE 3 is a cross-sectional view on line III—III of FIG. 2;
FIGURE 4 is a cross-sectional view on line IV—IV of FIG. 2;
FIGURE 5 is an end-view of the polygonal ring;
FIGURE 6 is a cross-sectional view on line VI—VI of FIG. 5.

The joint shown comprises six rectilinear dowels 1 of rubber of a circular cross-sectional shape in a regular hexagonal arrangement. The dowels are connected to one another end to end by rigid plate-like connectors 2 to form a polygonal ring 10 (FIG. 5). Each of the connectors consists of a pair of component plates 2a which are mutually superposed and spot-welded together as denoted by reference numerals 7 in FIGURES 3 and 4.

The dowels 1 are bonded to their respective plates 2a and the latter comprise each a wing portion 2b coplanar with the corresponding wing portion on its companion-plate in the connector; the two wings jointly form a planar segment shaped base for the attachment of the connector to its supporting spider. As will be seen in FIGURES 5 and 6, the bases of the six connectors in the polygonal ring are alternately arranged on the opposite sides of the latter on a pair of mutually parallel planes Y and Z, respectively, perpendicular to the axis of the ring.

A circular aperture 8 is formed in each of the wings 2b, the apertures 8 being all located on a common circumference concentrical with the ring.

The ring 10 is manufactured by inserting its six connectors into a sectional hollow mould the moulding cavity of which is a negative of the ring, and by injecting a suitable rubber blend into the cavity and vulcanizing in the mould the injected blend, so that the rubber dowels formed in the mould are vulcanized to the connectors.

The spiders of the joint comprise each a sheet metal circular cap 5, 6, respectively, and an axial hub 3, 4 respectively.

More specifically, the caps 5 and 6 are substantially planar and comprise each a central aperture such as 5a (FIG. 3), surrounded by a cylindrical flange 5b, forming a seat for the corresponding hub 3 (FIG. 1), the latter being welded to the cap coaxially with the latter. Each of the caps 5, 6, also comprises a circumferential cylindrical flange, such as 5c (FIG. 3); the two flanges on each cap extend in the same direction and enclose therebetween a shallow channel 5d, the depth of which is substantially equal to the thickness of the wings 2b (see the upper part of FIG. 3) and the radial width of which is slightly greater than the radial width of said wings, so that the aforementioned base of each connector 2 can be seated in the channel, such as 5d in its respective cap, on assembly of the joint.

In order to exactly locate each connector on its cap, each of the caps is formed with a circular series of bosses 9 (FIGURES 3 and 4), punched-out from the bottom of the channel 5d, which, on assembly, are engaged in their corresponding apertures 8 (FIG. 5) in the wings 2a, whereupon the latter are spot-welded (as indicated at 7a in FIG. 5) to the cups.

It is customary, in the joints of the hereinbefore defined character, to have the dowels in the polygonal ring pre-compressed between their connectors in order to avoid tensional stresses on the dowels in operation; this is advantageously also the case in the joints of this invention, a suitable dimensioning of the polygonal ring and spiders being sufficient to that end. Actually, the polygonal ring is moulded to a "pitch" diameter greater than that corresponding to its spiders and is then precompressed to its desired pitch diameter. The so pre-compressed ring is then assembled with its two spiders and welded thereto as hereinbefore described, with the locating bosses 9 engaging in the locating apertures 8, whereupon the tie-band is removed.

The hubs 3, 4 of the spiders are formed with conventional splined bores (see FIG. 1) for coupling them with their respective shafts, and a suitable spherical centering device (generally indicated at 11 in FIG. 1) can be additionally provided between the spiders, if desired.

What we claim is:

An elastic universal joint for transmission of torque comprising; a pair of coaxially disposed and spaced spiders, each spider comprising a hub, a circular cap member secured coaxially to said hub and extending in an outwardly direction of said hub, spaced cylindrical flanges on said cap member defining an annular channel therebetween, the bottom of said channel having spaced pairs of bosses extending axially inwardly of said joint; a plurality of rectilinear rubber dowels; rigid plate-like connectors on opposite ends of each of said dowels; the dowels being arranged in a polygonal ring configuration in end-to-end relationship with the connectors of adjacent dowels being disposed juxtapositioned and secured to each other and located on radial planes; each connector having a wing disposed in said channel; and each wing having a recess receiving a respective one of said bosses for securing a respective connector to said flanges with the wings of alternate pairs of connectors secured to the flange of a respective spider.

(References on following page)

References Cited by the Examiner

UNITED STATES PATENTS

| | | | |
|---|---|---|---|
| 1,862,140 | 6/1932 | Guy | 64—14 |
| 2,127,942 | 8/1938 | Schmidt | 64—14 |
| 2,219,142 | 10/1940 | Williams | 64—14 |
| 2,659,219 | 11/1953 | Mosso et al. | 64—14 |
| 2,982,118 | 5/1961 | Franceschetti et al. | 64—13 |
| 3,112,626 | 12/1963 | Barone | 64—11 |

FRED C. MATTERN, Jr., *Primary Examiner.*

HALL C. COE, *Examiner.*